United States Patent [19]
Mauger

[11] 3,807,583
[45] Apr. 30, 1974

[54] UNLOADING STRUCTURE FOR A PARISON OVEN AND METHOD

[75] Inventor: Leroy L. Mauger, Douglassville, Pa.

[73] Assignee: Beloit Corporation, Beloit, Wis.

[22] Filed: Dec. 17, 1971

[21] Appl. No.: 209,201

[52] U.S. Cl. .................................... 214/21, 198/28
[51] Int. Cl. ............................................ B65g 47/34
[58] Field of Search .............. 263/6 B; 214/21, 152; 198/28, 185

[56] References Cited
UNITED STATES PATENTS

| | | | |
|---|---|---|---|
| 2,829,760 | 4/1958 | Hermann | 198/185 X |
| 296,506 | 4/1884 | Baldwin | 198/28 |
| 2,944,653 | 7/1960 | Hansen | 198/185 X |
| 3,004,651 | 10/1961 | Manspeaker et al. | 198/185 |

Primary Examiner—Robert G. Sheridan
Attorney, Agent, or Firm—Dirk J. Veneman; Bruce L. Samlan; Gerald A. Mathews

[57] ABSTRACT

An oven for heating parisons including a parison drive structure, a parison carrying structure in driving relation with said driving structure, and an unloading structure for removing parisons. The unloading structure includes a pair of rails inclined relative to the parison carrying structure. A pair of rigid members are secured to a stationary portion of the oven. The rigid members are arranged to allow the parison carrying structure to pass therethrough, and the rigid members are arranged to engage any parisons carried thereon. The parisons are unseated upon engagement with the rigid structures allowing the parison to move onto the rails. The parison drive structure moves the parisons up the inclined rails, thereby disengaging the parisons from the carrying structure. The unloaded parisons are then removed from the oven.

14 Claims, 4 Drawing Figures

UNLOADING STRUCTURE FOR A PARISON OVEN AND METHOD

BACKGROUND OF THE INVENTION

The present invention relates to plastic molding machinery and more specifically to machinery of the blow molding type.

In one type of plastic machinery used for blow molding, cold parisons are heated in an oven structure and are then transferred to a mold structure where the plastic material is blow molded into a suitable container. Parisons entering the oven are preformed and may be of any suitable shape, this is known as the cold parison forming method, in contradistinction to the well known continuous forming hot parison forming method. An example of a cold parison machine may be found in copending application Ser. No. 3,003 by L. A. Moore filed Jan. 15, 1970.

The oven used in the practice of the present invention includes a drive structure which is used to drive a plurality of parison holding structures. The parisons are moved back and forth in a predetermined path by the drive structure, until a desired temperature is reached, depending upon the particular type of plastic used. The temperature of the parison is determined by the oven temperature and the length of time the parison remains in the oven. Upon reaching the desired parison temperature, the parisons are removed from the oven at a pick-up station and are transferred to a blow molding structure where they are blown into suitable containers. If a malfunction occurs in the machine, and the blow molding step cannot proceed, the parisons moving past the pick-up staion must be removed from the oven, because if the parisons remain in the oven in exccss of the predetermined time the parisons will become overheated. The drive structure moving the parisons through the oven is not stopped, since the oven is of the continuously moving type.

The structures presently used to remove parisons from ovens, after the parisons have passed the pick-up station, comprise pneumatically operated picker arms. More specifically, if a particular parison passes the pick-up station, the parison activates an electrical switch which moves the parison picker arm into the oven. A pair of fingers, mounted on the picker arm, are utilized which, when the picker arm reaches a pick-up position, are closed thereby grasping the parison. The picker arm is then pneumatically actuated to move out of the oven. The fingers are opened and the parison is released. A spring-loaded door closes the oven to block the oven exit opening, during the parison removal to maintain the oven temperature at its critical temperature. Upon activation of the switch by the next parison, the door is opened, and the arm moves into the oven to repeat the parison removal procedure described above.

The presently utilized parison removal devices are very expensive to manufacture, are fairly complicated, have many moving parts, incur a high risk of failure and are expensive to service. It would be desirable then, to provide a parison removal device which would substantially reduce the manufacturing cost, reduce the number of parts, minimize the risk of failure and minimize maintenance needs.

SUMMARY OF THE INVENTION

A blow molding machine having an oven for heating and delivering parisons to a blow molding station of a blow molding machine. The oven includes a parison drive structure which comprises a link chain structure. The drive structure is arranged in driving relation to a parison carrying structure. The parison carrying structure comprises a pin projecting from the parison carrying structure and the pin is mounted in apertures in the drive structure; the pin receives any parisons disposed thereon. Also mounted in the oven is a parison removal structure, which, according to the invention, comprises a pair of rails one disposed on each side of the drive structure. One end of the rails is mounted in close proximity to the carrying structure. The rails are mounted at an angle with respect to the carrying structure.

At a predetermined point where the rails and the carrying structure are in close proximity, means are provided to allow the parison to move onto the rails. These means include a pair of rigid members secured to a stationary portion of the oven. Upon engagement of the parison on the carrying structure with the rails the parison is unseated so that the parison will move onto the rails. The drive means moving the parison carrying structure and the parison disposed thereon, forces the parison onto the rail structure and disengages the parison from the carrying structure. When the parison reaches the end of the rails, the parison is separated from the carrying structure. The parison then strikes an inclined wall which directs it into an exit trough and removes it from the oven.

The parison removal structure described above greatly reduces costs when compared to presently used removal structures. The parison removal or unloading structure of the present invention has a minumum of moving parts and there is an extremely low risk of failure while maintenance costs are almost non-existent.

DESCRIPTION OF THE PREFERRED EMBODIMENT

Figure 1:
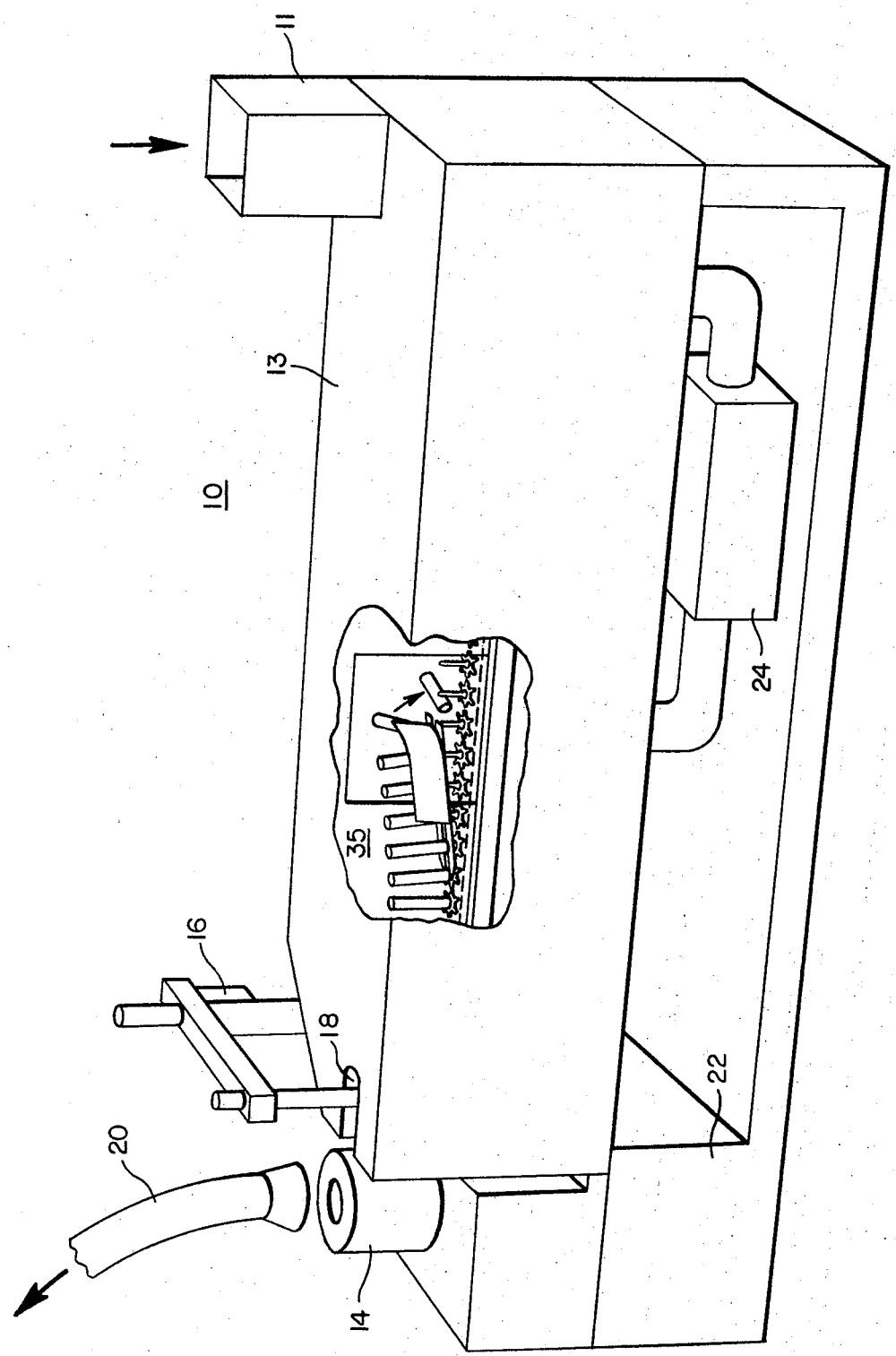
FIG. 1 is a simplified isometric view of a blow molding machine having an oven incorporating the present invention.

Referring to the drawings and more specifically to FIG. 1, there is shown a blow molding machine 10 in simplified form. The machine 10 includes a material or parison feeder 11 and an oven 13 for heating the parisons. The feeder 11 delivers the parison to the oven 13. A blow molding device 14 is mounted on the other side of the oven 13 opposite the feeder 11. Plastic parisons in the oven 13 are transferred to the mold 14 by a transfer arm mechanism 16. The arm 16 moves into the oven 13 through an inlet opening 18 in the top portion of the oven 13. After grasping the parison, the transfer arm moves out of the oven 13, rotates towards the mold 14 and moves the parison into the mold 14, where it is blown into a suitably shaped container. After transferring the parison to the mold the arm 16 swings back to the oven 13 while the finished blown container is ejected from the mold 14 through ejector conduit 20. The feeder 11, the oven 13, the transfer arm 16, and the mold 14 are supported on a suitable base structure 22. The oven 13 is heated by heating means 24 which may also be supported on the base 22. A more detailed description of the blow molding machine 10 can be found in the previously cited U.S. application of L. A. Moore Ser. No. 3,003.

In the preferred embodiment of the invention shown in FIG. 1, the plastic material is fed into the oven in the form of a parison, i.e., a hollow cylinder; other preforms may be used, such as disk-shaped structures. For the purpose of this invention and the appended claims, parisons include any suitably shaped preformed plastic article.

Figure 2:
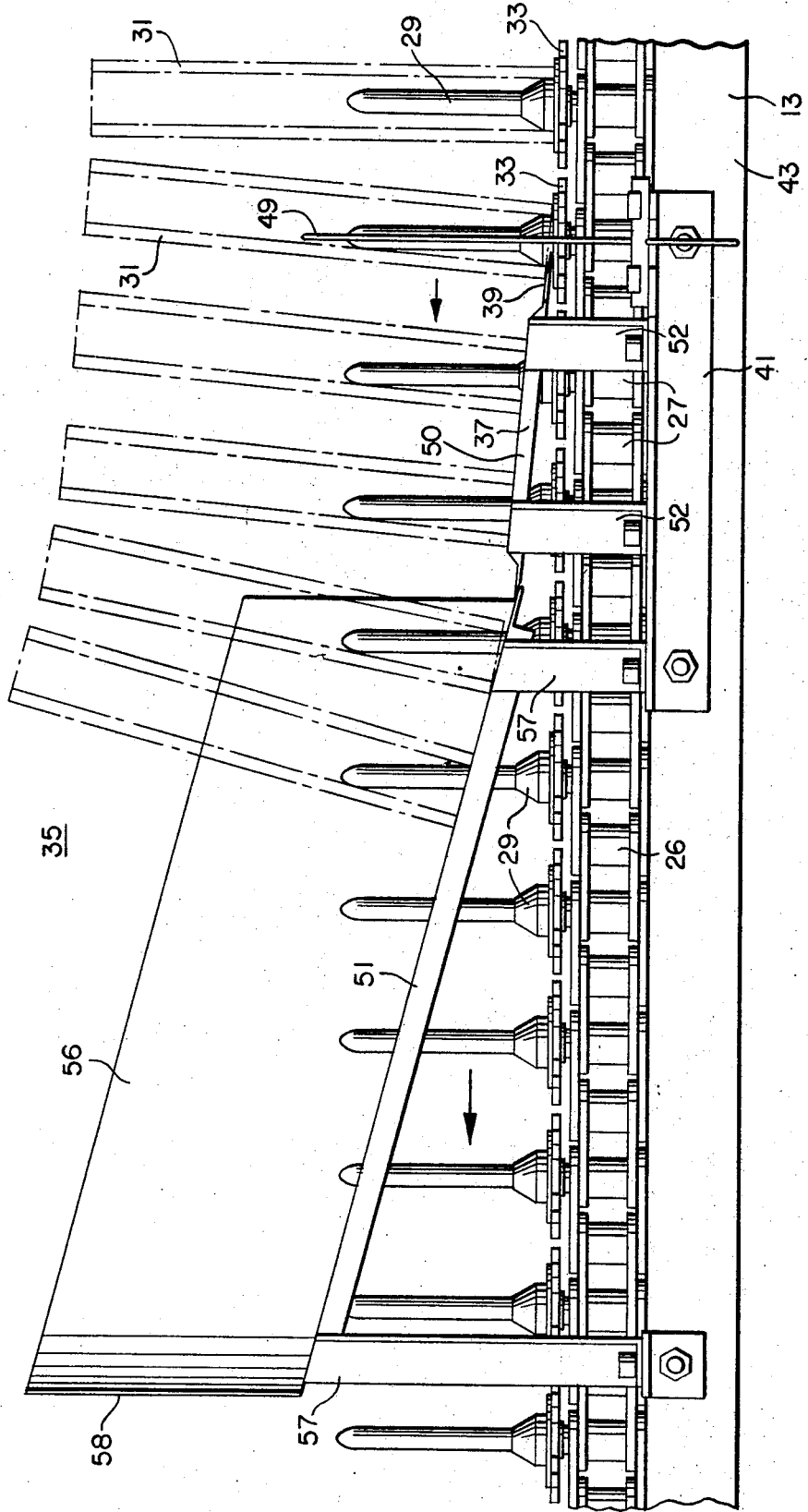
FIG. 2 is an enlarged front elevational view of the unloader assembly, shown in FIG. 1.

As can best be seen in FIG. 2, a parison drive or advance structure 26 is mounted in the oven 13. The drive structure 26 is comprises a plurality of chain links 27 connected to each other. The chain is arranged for movement along a predetermined path within the oven by any suitable guide means (not shown). The chain 27, at each link supports and advances the parison carrying structures 29. The parison carrying structures 29 are mounted on corresponding links in the chain 27 and project outwardly from the links and carry the parisons 31 shown in phantom lines. Other suitably shaped carrying structures 29 may be utilized depending on the shape of the plastic preform.

The carrying structure 29 is also supported on a rotatable star wheel structure 33. The star wheel structure is shown in detail in FIG. 4. For a more detailed description of the star wheel 33, and the parison carrying structure 29, reference is made to copending application by L. L. Mauger and L. A. Moore, Ser. No. 165,136, filed July 22, 1971.

The chain or drive means 26, 27 may be arranged to travel along any suitable path within the oven 13. The temperature of the parison as it exits from the oven is determined by the temperature in the oven and the length of time the parison remains in the oven. The transfer arm 16 (FIG. 1) enters the oven 13 through inlet opening 18 and removes the parison which is seated on the carrying structure 29 at a location hereinafter referred to as the pick-up station. When a parison is rejected by the pick-up station, it must be removed from the oven since the temperature of the parison will become too great because the oven is of the continuously moving type.

In accordance with the principles of the present invention, there is provided an unloading or removal structure 35 (FIGS. 1 and 2) for removal of parisons from the oven 13. The removal structure 35 includes a pair of rails or tracks 37 (FIGS. 2 and 4), one rail being disposed on each side of the chain 27. The rails 37 are mounted in spaced relation thus defining a passageway therebetween. As can best be seen in FIG. 2, the rail 37 is mounted so as to deviate from the plane of the chain 27. Each rail 37 has a leading edge 39 mounted in close proximity to the rotatable star structure 33.

Figure 3:
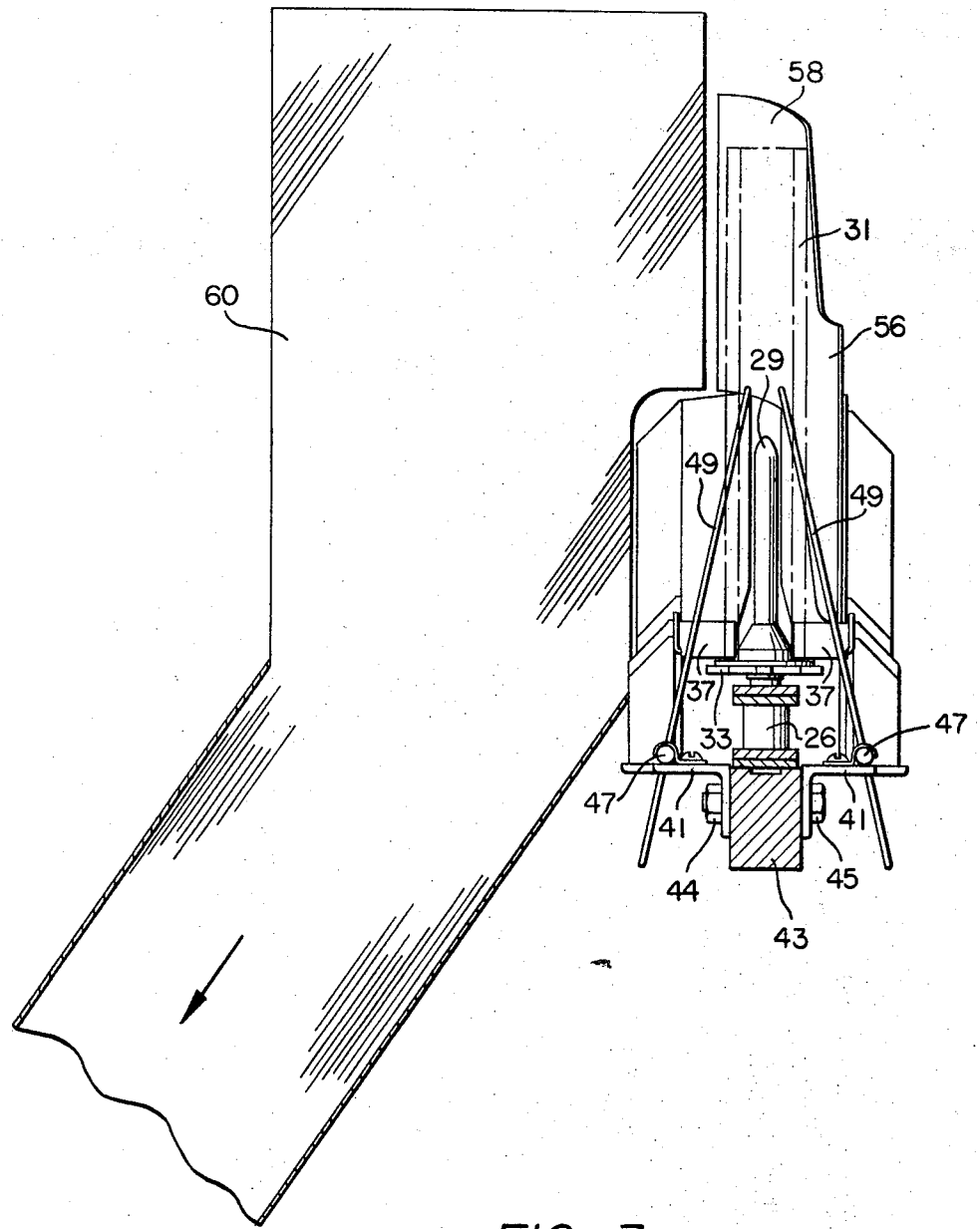
FIG. 3 is a cross sectional view of the unloader assembly shown in FIG. 2.

As shown in FIG. 3 the rails 37 are spaced at a sufficient distance from each other and a sufficient distance above the chain 27 (FIG. 3), to allow the carrying structure 29 to pass between the rails and to allow the drive structure 26 and the star wheel 33 to pass under the rails without contacting the rails. However, the rails 37 are spaced sufficiently close to the star wheel 33 so that a parison approaching the rails cannot proceed without contacting and being forced onto the rails.

As shown in FIG. 3, a pair of angularly shaped members 41 are secured to the base portion 43 of the oven 13 by means of nuts and bolts 44, 45. A pair of holding members 47 secure a corresponding pair of rod or spring members 49 to the angularly shaped members 41. As shown, one rod or spring member 49 is mounted on either side of the parison carrying structure 29.

The rods or spring members 49 are inclined towards each other but spaced apart so that the portion defining the base portion is wider than the portion defining the apex. The base portion is wider than the maximum width of the parison 31 while the apex defined by the members 49 is narrower than the width of the parison 31. It will therefor be noted that the parison carrying member 29 freely passes through the space between the rod or spring members 49, however, any parison mounted on the carrying member 29 will make contact with the closer spaced upper portion of the rod or spring members 49.

Figure 4:
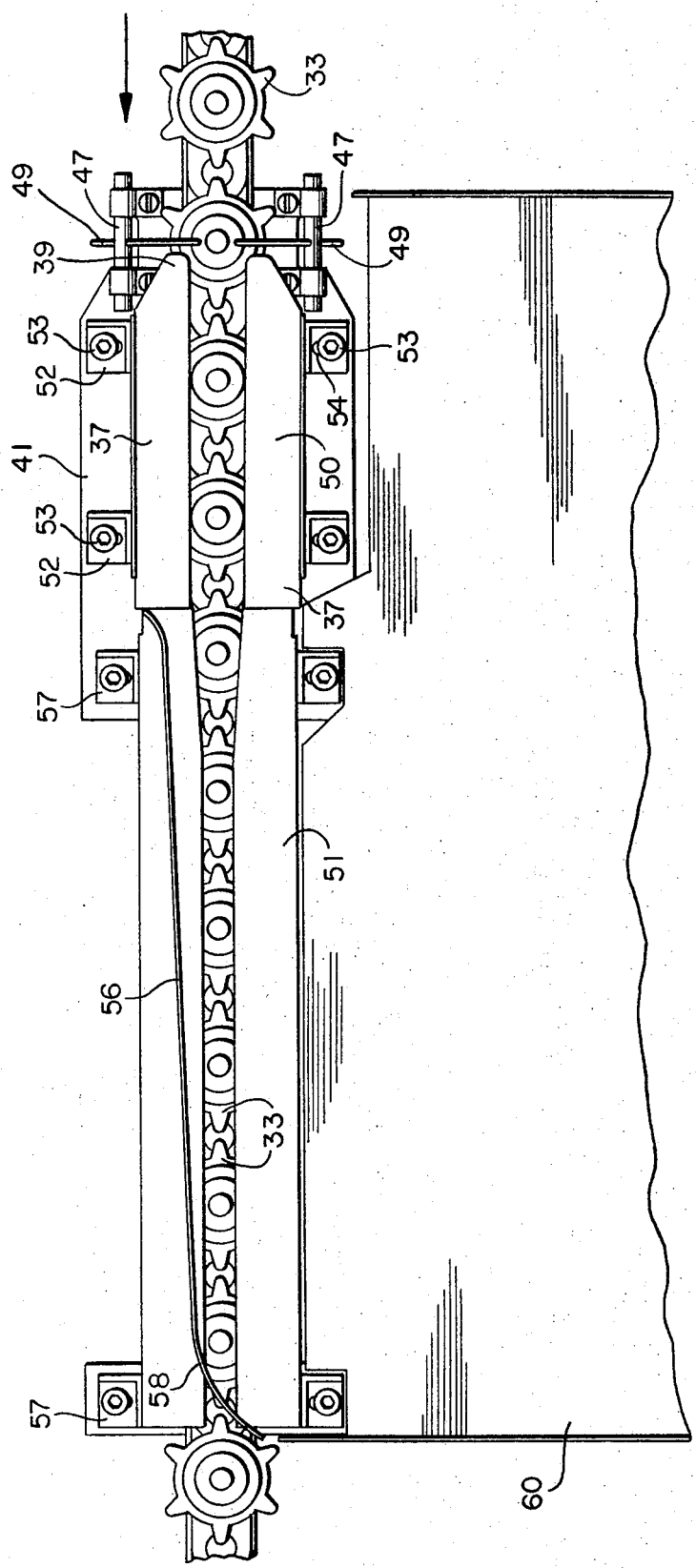
FIG. 4 is a plan view of the unloader assembly shown in FIG. 2.

As shown in the preferred embodiment, the rail structure 37 comprises two portions namely, an entrance portion 50 and an exit portion 51 (FIGS. 2, 3 and 4). The entrance portion 50 is adjustably secured to support structures 52, (FIG. 2). The support structures 52 are secured to the angle members 41 by set screws 53 (FIG. 4). The screws 53 adjustably secure the rails 37 to support structure 52 in a proper spaced relation by means of elongated holes 54. By dividing the rail structure into two sections 50, 51, only the front section 50 needs to be adjusted to accommodate parison size rather than having to adjust the entire length of the entrance and exit portions of the rail structure.

The removal structure 35, further includes a slanted wall portion 56 (FIGS. 2 through 4). The wall portion 56 has a curved end portion 58 which prevents parisons from falling into the oven from the elevated rails 37. The rail portions 50 and 51 gradually deviate from the plane of travel of the piston carrying structure by means of supports 57. The deviation is adjustable.

As best shown in FIGS. 3 and 4, parison exit trough 60 communicates with the removal structure 35 so that parisons removed therefrom are ejected into the exit trough 60 by means of which they are removed from the parison oven 13.

In operation, parisons enter the material feeder 11 and are properly disposed onto the parison carrying structure 29 within the oven 13. The carrying structure 29, with parisons disposed thereon, is moved through the oven 13 by the driving means or chain 26, 27. The parisons are heated during their travel through the oven by the heating structure 24. Upon reaching the pick-up station the parisons are removed from the carrying structure 29 by the transfer arm 16. If for some reason there is a jam-up the machine, as occasionally occurs within the mold portion 14, the transfer arm 16 will not remove parisons from the oven. Since the chain 27 moves continuously and parisons are now on the carrying structure 29 and have passed the pick-up station, these parisons will be heated to a temperature higher than desired for blow molding. These parisons will continue to move along the path until they encounter the parison removal structure 35.

Individual parison carrying structures 29, which do not carry parisons thereon, are free to pass through the rail structure 37 and the rods 49 without any interference. The parison carrying structures 29 which do carry parisons thereon, shown as dashed parisons 31 in FIG. 2, are first encountered by the rod or spring members 49. As the parison 31 moves forward it contacts the members 49, which causes the parison to tilt backwards and unseat from the carrying structure 29 as shown in FIG. 2. This allows the leading edge 39 of the rail structure 37 to slip under the parison 31. The forward motion of the carrying structure 29 with the parisons thereon causes the parison to move up the rail structures 37. The parison 31 is thus slowly separated from the carrying structures. When the parison reaches the top portion of the rail structure 37, it is completely disengaged from the carrying structure 29. At this point, it engages the wall portion 56 and subsequently contacts the curved portion 58 of the wall 56, causing the parison to fall into the exit trough 60. From the exit trough 60 the parisons are removed from the oven. If the plastic parisons are of the thermoplastic type, they may be recycled and formed into new parisons. Each parison which is not picked up at the pariso pick-up station will be engaged by the rods 49, moved onto the rail structure 37, and removed from the parison oven through the exit trough 60.

What is disclosed then is a parison removal structure which is substantially improved over present parison removal structures. It is simple, yet highly efficient. No sophisticated hydraulic or pneumatic system is required and cost of installation and maintenance are exceedingly low. Limit switches and other electrical circuitry are eliminated.

Although only one embodiment of the invention has been shown, it will be obvious to those skilled in the art that the invention is not so limited, but is susceptible to various other changes without departing from the spirit thereof.

What is claimed is:

1. A device for removing plastic parisons from a heating oven comprising in combination,
   a parison carrying structure,
   means driving said carrying structure through said oven along a predetermined path,
   a track structure mounted in inclined relationship to said carrying structure with its leading edge in close proximity to said carrying structure,
   and means for tilting a parison, said means having a parison engaging portion located intermediate the ends of the parison and positioned in advance of the track structure for engaging the parison intermediate its ends to lift its forward bottom edge from the carrying structure whereby to facilitate movement of the bottom of the parison onto the track structure.

2. The device of claim 1 wherein the track structure comprises a pair of rails, said rails being spaced from each other to allow the parison carrying structure to pass therebetween.

3. The device of claim 1 wherein said track structure comprises an entrance portion and an exit portion, said portions being adjustable relative to each other,
   and said entrance portion being disposed adjacent said carrying structure.

4. The device of claim 1 wherein the track structure is elevated relative to said drive means and the track structure is supported from the oven.

5. The device of claim 1 wherein the track structure comprises a pair of track members, said track members being mounted in spaced relation relative to each other to allow passage of the carrying structure therebetween,
   each of said track members having an entrance and exit portion,
   each of said portions being adjustable relative to each other to allow independent positioning of each of said portions relative to each other,
   and said track members being rigidly supported to a stationary portion of the oven.

6. The device of claim 1, wherein said means for tilting the parison is secured to a rigid portion of the oven,
   said tilting means being mounted in spaced relation to the parison carrying structure and comprising a rod engageable with a parison carried by said carrying structure.

7. The device of claim 1 wherein said parison tilting means includes a pair of resilient rods projecting from the stationary portion of the oven,
   said rods being on opposite sides of said driving means,
   said rods being spaced from the driving means and the carrying structure to allow passage of the driving means and the carrying structure therebetween,
   said rods being inclined towards each other to engage a parison carried by said carrying means.

8. The device of claim 1 further including a wall structure, said wall structure engageable with a parison moving up said track structure to guide said parison off of said track structure.

9. The device of claim 1 further including an exit trough in communication with said track structure to remove parisons from said oven.

10. In an oven for heating plastic preform structures including carrying means to carry said preforms, means for driving said carrying means, and means to remove the preforms from said oven, said preform removal means comprising:
    a pair of rail members, said rail members being disposed on both sides of said driving means and in spaced relation therefrom,
    said rail members being inclined relative to said driving means,
    said rail members being supported from a stationary portion of said oven,
    said rail members having entrance and exit portions, said entrance portions being disposed in spaced relation to said carrying means but immediately adjacent thereto,
    at least one resilient rod member disposed from a stationary portion of said oven in close proximity to the entrance portion of said rail members,
    said rod member being in spaced relation with said driving means and said carrying means to allow passage thereby,
    said rod member being engageable with any said preform carried by said carrying means, to unseat said preform and allow said rail structure to engage the bottom portion of any preform seated on said carrying structure,
    and said driving means moving any preform seated on said carrying means up said inclined rail structure to thereby disengage the preform from the carrying means.

11. The structure recited in claim 10 further including a wall member, said wall member being engageable with any preform carried up the rail members, said wall structure directing the preforms off of said rail members.

12. The structure recited in claim 11 further including an exit trough, the wall member guiding the preforms from the rail member to said exit trough for removal from said oven.

13. A method of removing parisons from an oven comprising the steps of:
1. driving parisons on a carrying structure in the oven along a predetermined path,
2. moving the parisons from the carrying structure to an inclined removal structure,
3. tilting the parison so that its forward bottom edge is lifted from the carrying structure,
4. separating the parisons from the carrying structure by moving the parisons up the inclined removal structure, and
5. disengaging the parisons from the carrying means.

14. The method recited in claim 13 further including the steps of:
1. guiding the parisons off of the rail structure, and
2. removing the parisons from the parison oven.

* * * * *